Sept. 11, 1923.  
A. H. KENNEWEG  
1,467,642
MULTIPLE OPERATING MECHANISM FOR SHIPS' PORTS AND THE LIKE
Filed Nov. 4, 1921   3 Sheets-Sheet 1
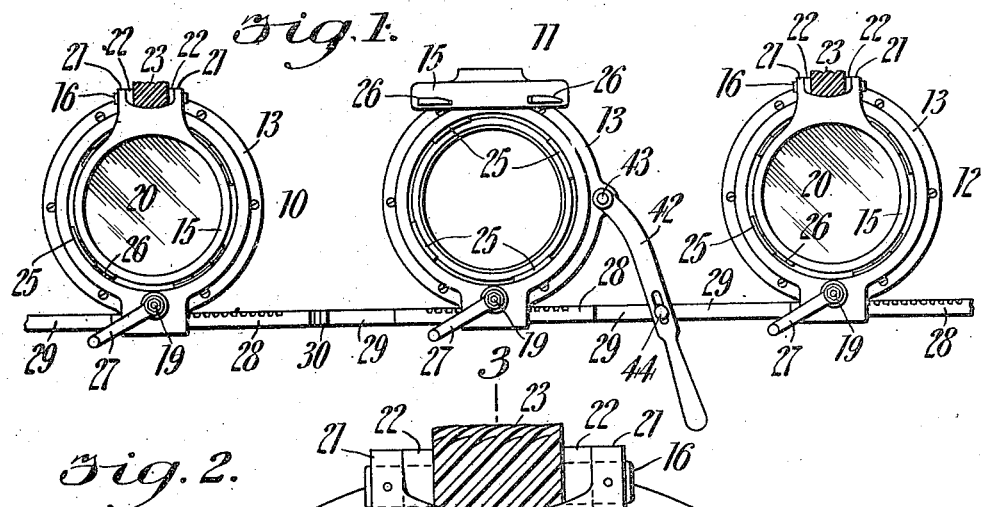
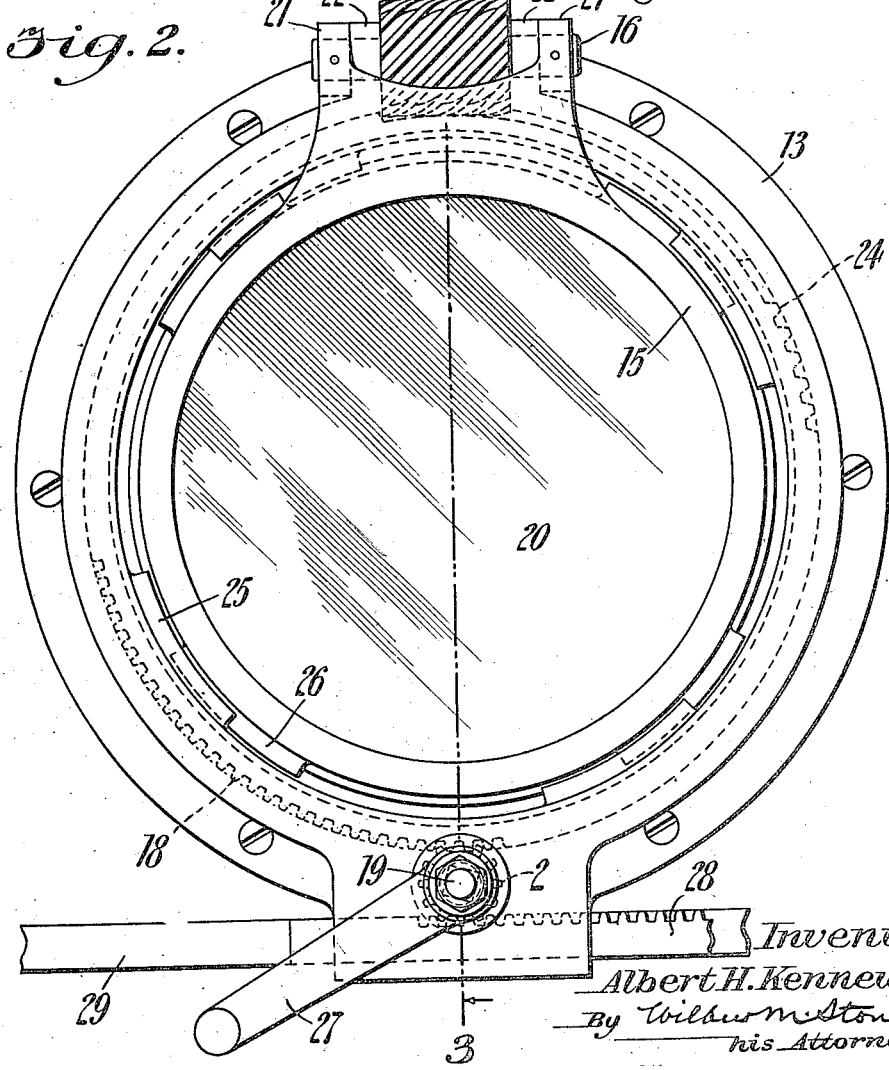
Inventor,  
Albert H. Kenneweg;  
By Wilburn M. Stone  
his Attorney.

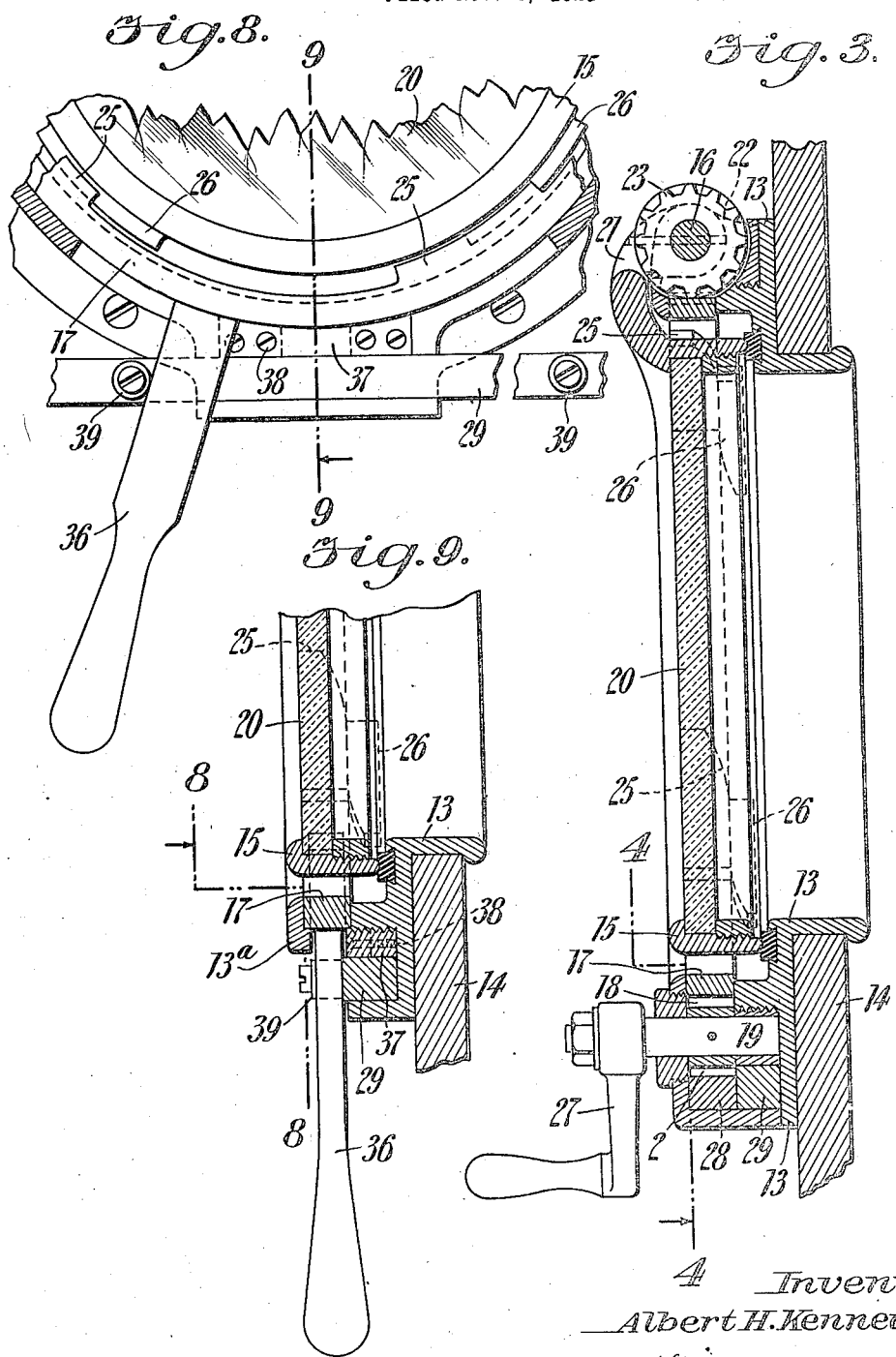

Sept. 11, 1923.　　　　　　　　　　　　　　　　1,467,642
A. H. KENNEWEG
MULTIPLE OPERATING MECHANISM FOR SHIPS' PORTS AND THE LIKE
Filed Nov. 4, 1921　　　3 Sheets-Sheet 3
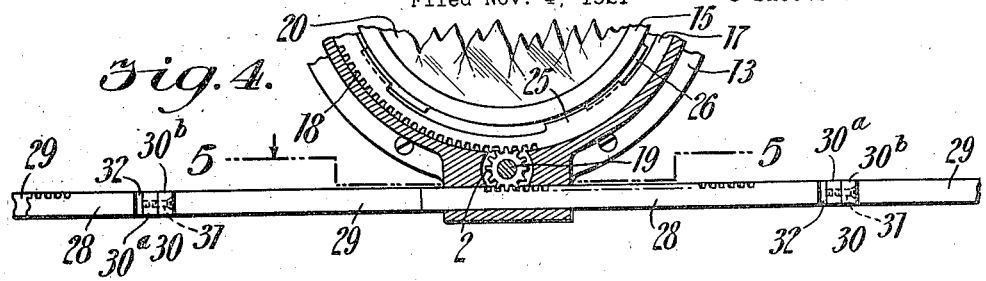
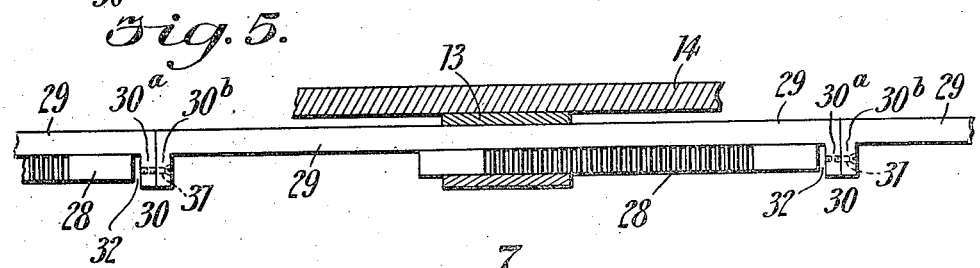
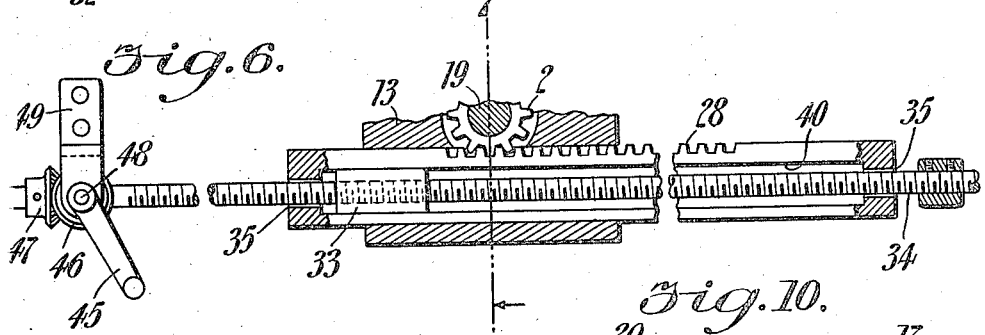
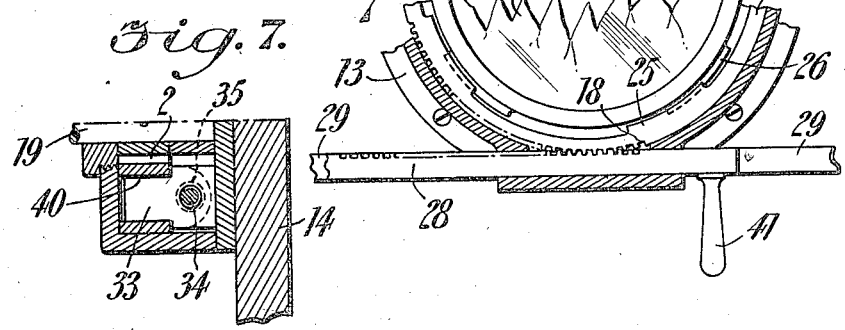
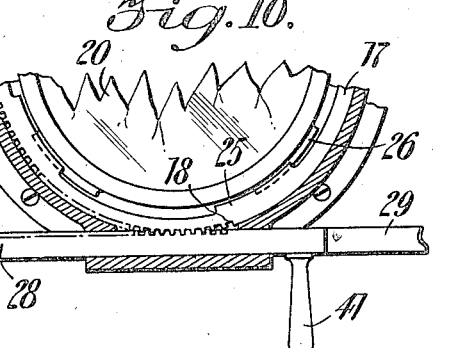
Inventor,
Albert H. Kenneweg,
By Wilbur M. Stone
his Attorney.

Patented Sept. 11, 1923.

1,467,642

UNITED STATES PATENT OFFICE.

ALBERT H. KENNEWEG, OF BROOKLYN, NEW YORK, ASSIGNOR, BY MESNE ASSIGNMENTS, TO KAM-KAP APPLIANCE CO., INC., A CORPORATION OF NEW YORK.

MULTIPLE OPERATING MECHANISM FOR SHIPS' PORTS AND THE LIKE.

Application filed November 4, 1921. Serial No. 512,807.

*To all whom it may concern:*

Be it known that I, ALBERT H. KENNEWEG, a citizen of the United States, and a resident of New York, borough of Brooklyn, in the county of Kings and State of New York, have invented certain new and useful Improvements in Multiple Operating Mechanisms for Ships' Ports and the like, of which the following is a specification.

This invention relates to multiple operating mechanisms for ships' ports and the like, and has for its object to provide a mechanism of the class described. simple in construction, easy of operation and readily adaptable to various environments.

In the drawings accompanying this specification, Figure 1 is a front elevation of a gang of ports or the like to which my improved operating mechanism is applied. Fig. 2 is an enlarged front view of one of the ports of Fig. 1. Fig. 3 is a vertical section on line 3—3 of Fig. 2. Fig. 4 is a fragmentary sectional elevation taken on line 4—4 of Fig. 3. Fig. 5 is a sectional plan view on line 5—5 of Fig. 4. Fig. 6 is an elevation similar to that of Fig. 4, showing a modification of my improvements. Fig. 7 is a sectional elevation on line 7—7 of Fig. 6. Fig. 8 is a sectional elevation on line 8—8 of Fig. 9, illustrating a further modification of my improvements. Fig. 9 is a vertical section on line 9—9 of Fig. 8. Fig. 10 is an elevation similar to that of Fig. 4, and illustrating a detail modification of my improvements. Figs. 2, 3, 6, 7, 8 and 9 are to one scale, four times that of Fig. 1, and Figs. 4, 5 and 10 are to another scale, two times that of Fig. 1.

While I have herein illustrated my improvements as particularly applied to the operation of a gang of port lights, the scope of my invention includes the operation of a wide variety of devices arranged sequentially in a wide variety of relative positions. For purposes of illustration, the particular port light shown herein corresponds with that set forth in my co-pending application Ser. No. 510,522, filed October 26, 1921, to which reference may be had.

Directing attention now particularly to Figs. 1 to 5 inclusive, 10, 11, 12 of Fig. 1 represent three port lights arranged in a row to which my improved multiple operating mechanism is applied. Each of said port lights includes frame 13 fixed to the ship's side wall 14, cover 15 movably mounted relatively to frame 13, said cover preferably being pivoted to said frame at 16, cover moving means including ring 17 rotatably mounted on frame 13, preferably having gear teeth 18 in the lower portion of its periphery, Figs. 2 and 3 for instance, and which may engage the teeth of pinion 2 fixed to shaft 19 mounted for rotation in a fixed bearing in frame 13. Said cover 15 is preferably annular, carries glass 20 therein, and is provided with ears 21, 21 fixed to pivot shaft 16 and which shaft turns freely in ears 22, 22 of frame 13. Between ears 22, 22 and fixed to shaft 16 is spiral gear 23 for intermittent engagement with spiral gear teeth 24 on ring 17. Said ring 17 may be provided with a plurality of inreaching lugs 25, arranged and adapted for overriding ears 26, respectively, projecting outwardly from cover 15, when said cover is in its closed position, of Figs. 2 and 3 for instance. Shaft 19 may be provided with crank 27 for hand rotation thereof.

Slidably mounted in frame 13 contiguous to and in engagement with pinion 2 is rack 28, forming an operative connection between said gear and actuator 29, preferably mounted for reciprocation adjacent said rack in frame 13. Said actuator 29 preferably comprises a long rectangular bar having dogs, as 30, 30, oppositely disposed relatively to the length of each rack 28 and for engagement with either end of each rack of each port light in the row. For convenience of manufacture and assembly, said bar 29 is preferably made up of lengthwise sections secured together end to end. Such securing may conveniently be had by forming dogs 30, half on the end of one bar section, at 30ª, and half on the end of the adjoining bar section, at 30ᵇ. Said half dogs may be attached to one another by screws, as 31. Any given pair of said dogs, as 30, 30, Fig. 4 and 5, coacting with rack 28 of those figures, are spaced apart sufficiently to permit the required travel of said rack 28 when the port light is operated by hand. That is, the distance between dogs 30, 30 in said Figs. 4 and 5 is equal to the length of rack 28 plus the operative length of travel of said rack. In practice it is also desirable to provide a slight additional space as 32 to allow for possible inaccuracies of construction. It will thus be seen that said gear 2 has an operative stroke of rotation independent of actuator 29 and that rack 28 also has a field of movement independent of said actuator. For reciprocating actuator 29 there is provided lever 42 pivoted at one end to a fixed portion, as ear 43 of one of frames 13. Said lever is slidably engaged near its midlength by pin 44 outstanding from one of dogs 30.

In the modification of Figs. 6 and 7, rack 28 may be provided with lengthwise mortise 40 in which is slidably mounted nut 33 in engagement with lengthwise actuator screw 34. The ends of said rack are perforated at 35, 35 for the passage of screw 34. The length of mortise 40 in rack 28 is equal to the length of operative travel of said rack plus the length of nut 33. Also a slight additional length may be provided for inaccuracies of construction if desired. Actuator screw 34 is held against endwise movement by known means not shown. Screw 34 may be rotated from crank 45 through bevel gears 46, 47 the former of which is fixed to crank shaft 48 and the latter to said screw. Bracket 49 carrying shaft 48 may be secured to a fixed part of the ship or framing.

In the modification of Figs. 8 and 9, gear 2 and rack 28 are omitted and lever 36, projecting downwardly from ring 17 is provided for oscillating said ring. Dogs 30, 30, of Figs. 4 and 5 for instance, may carry rolls as 39, 39, for reducing the frictional engagement thereof with lever 36. For facility of assembling lever 36 in frame 13, cap portion 13$^a$ thereof may have removable gate 37 secured therein by screws, as 38.

The hand operation of one of said port lights is as follows: Assuming that two of a gang of said lights are closed and locked as shown at 10 and 12, Fig. 1, with actuator 29 at approximately mid-position, Figs. 1, 4 and 5, crank 27 is rotated in clockwise direction, Fig. 2, whereby ring 17 is rotated by gear 2 in anti-clockwise direction and lugs 25 are withdrawn from overriding ears 26 of cover 15. Said cover is thus free to swing open on its pivot at 16. Further rotation of ring 17 in anti-clockwise direction causes spiral teeth 24 thereof to engage spiral gear 23 fixed to pivot shaft 16 whereby cover 15 is swung upwardly from position 10 of Fig. 1 to position 11 thereof. During this opening operation rack 28 is moved idly by gear 2 to the left, between opposite dogs 30, 30, from the position shown under ports 10 and 12, for instance, to the position shown under port 11, Fig. 1, wherein said rack has been moved about half its stroke to the left, the port cover being about half way open as illustrated. It will also be obvious that said port 11 may be closed by hand individually by reversing the direction of rotation of crank 27.

For opening a plurality of port lights at one time, actuator 29 is moved to the left, Figs. 1, 2, 4 and 5, whereby dogs 30, 30 engage racks 28 and move them to the left from the position relative to ports 10 and 12 of Fig. 1 to the position of port 11 of that figure and beyond, thereby unlocking and swinging said ports open, as described in connection with the hand operation of port 11. As said port 11 has already been partly opened by hand, actuator 29 is ineffective to move rack 28 thereof during the early portion of its stroke, but picks up said rack at about the middle of its stroke and carries it farther to the left to open said port its full amount together with the outer ports of the gang.

If however it is desired to close any one of said ports by hand bar 29 being in the position shown in Figs. 1, 4 and 5, anti-clockwise rotation of its particular crank 27 will accomplish this result independently of any other port. If however, it is desired to close all the ports in a gang at one time, the movement of actuator 29 from its extreme left hand position to its extreme right hand position will cause its dogs 30 to engage the left hand ends of all of racks 28, respectively, thereby rotating gears 2 in anti-clockwise direction and rings 17 in clockwise direction, respectively, whereby said covers 15 will be closed and then locked as described. In the modification of Figs. 6 and 7, actuator screw 34 is rotated, thereby causing its nuts, as 33, to travel lengthwise thereof for engagement with either end, as the case may be, of mortises, as 40, respectively, in racks, as 28.

In the modification of Figs. 8 and 9, the endwise reciprocation of actuator 29 causes dog rolls 39, 39 to engage the contiguous edges of levers 36, respectively, thereby rotating rings 17 to function as described.

In the modification of Fig. 10, pinion 2 is omitted and rack 28 engages teeth 18 in ring 17 directly. In this case rack 28 may be provided with handle 41 for reciprocating said rack for rotating ring 17. Also it will be noted that in the absence of pinion 2 said rack will be moved to the right to unlock and open the port cover.

I claim:

1. In a mechanism of the character described the combination of a frame, a cover mounted for movement relatively to said frame, means for moving said cover including a ring rotatably mounted on said frame and coacting means on said ring and cover, means for rotating said ring, a reciprocating member in operative engagement with the ring rotating means, and an actuator operatively connected with said reciprocating member, said reciprocating member having a field of movement independent of said actuator.

2. In a mechanism of the character described the combination of a frame, a cover pivoted thereto, a ring rotatably mounted on said frame, coacting means on said ring and cover for swinging said cover on its pivot and for locking said cover to said frame, gear means for rotating said ring, a rack in engagement with said gear means, a reciprocating actuator in operative relation to said rack, said rack having a lengthwise stroke independent of said actuator, and means for moving said actuator.

3. In a mechanism of the character described the combination of a frame, a cover pivoted thereto, a ring rotatably mounted on said frame, coacting means on said ring and cover for swinging said cover on its pivot, gear means for rotating said ring, a rack in engagement with said gear means, an actuator in operative relation to said rack, said rack having a lengthwise stroke independent of said actuator, and means for moving said actuator.

4. In a mechanism of the character described the combination of a plurality of devices each including a frame, a cover pivoted to said frame, a ring rotatably mounted on said frame, coacting means on said ring and cover for swinging said cover on its pivot, gear means for rotating said ring, a reciprocating actuator, racks operatively connecting said actuator with each of said gear means respectively, each of said racks having a field of travel independent of said actuator, and means for reciprocating said actuator.

In witness whereof, I hereby affix my signature, this 1st day of November, 1921.

ALBERT H. KENNEWEG.